US008757064B2

(12) United States Patent
Jennings et al.

(10) Patent No.: US 8,757,064 B2
(45) Date of Patent: Jun. 24, 2014

(54) OPTICAL PROXIMITY FUZE

(75) Inventors: Martyn Robert Jennings, Bradley Stoke (GB); Lee Douglas Miller, Portishead (GB)

(73) Assignee: MBDA UK Limited, Hertfordshire (GB)

( * ) Notice: Subject to any disclaimer, the term of this patent is extended or adjusted under 35 U.S.C. 154(b) by 126 days.

(21) Appl. No.: 12/595,003

(22) PCT Filed: Aug. 6, 2009

(86) PCT No.: PCT/GB2009/050985
§ 371 (c)(1),
(2), (4) Date: Mar. 22, 2011

(87) PCT Pub. No.: WO2010/015860
PCT Pub. Date: Feb. 11, 2010

(65) Prior Publication Data
US 2011/0185935 A1   Aug. 4, 2011

(30) Foreign Application Priority Data

Aug. 8, 2008 (GB) .................................. 0814503.9
Mar. 12, 2009 (EP) .................................. 09275015

(51) Int. Cl.
*F42C 13/02* (2006.01)
(52) U.S. Cl.
USPC ........................................ 102/213; 102/211
(58) Field of Classification Search
USPC .............. 102/211, 213; 356/3.02, 5.06, 141.4
See application file for complete search history.

(56) References Cited

U.S. PATENT DOCUMENTS 2,925,965 A * 2/1960 Pierce .............................. 89/135
3,942,446 A * 3/1976 Cruzan ........................... 102/213
4,123,165 A * 10/1978 Brown et al. .............. 356/139.03
4,306,500 A * 12/1981 Castanien et al. ............. 102/213
4,651,647 A * 3/1987 Baker ............................ 102/213
4,859,054 A * 8/1989 Harrison ....................... 356/5.06

(Continued)

FOREIGN PATENT DOCUMENTS

DE    32 19 082 A1    11/1983
DE    101 62 009 A1    7/2003

(Continued)

OTHER PUBLICATIONS

Von Der Lippe, et al., "Advanced Optical Fuzing Technology", The International Society for Optical Engineer, SPIE Newsroom, 2006, 10.1117/2.1200601.0066, pp. 1, 2.

*Primary Examiner* — Bret Hayes
*Assistant Examiner* — Joshua Freeman
(74) *Attorney, Agent, or Firm* — Scully, Scott, Murphy & Presser, PC

(57) ABSTRACT

Described herein is an optical fuze for a guided missile that comprises an array of a large number of optical apertures distributed about the outer surface of the missile. An optical waveguide network selectively couples the array of apertures to a laser source and to a photodetector such that light from the laser source is emitted by selected ones of said apertures, and light returned from a target is received by selected ones of said apertures and directed by said optical waveguide network to said photodetector. These apertures might be arranged to form a composite target images in a particular direction, and/or may be arranged to perform a sensing operation along selected directions. The optical proximity fuze described herein provides inherent flexibility in the way the fuze can be configured in the missile for optimisation for different applications.

14 Claims, 6 Drawing Sheets

(56) References Cited

U.S. PATENT DOCUMENTS

| | | | |
|---|---|---|---|
| 4,896,606 A * | 1/1990 | De Coi | 102/213 |
| 4,903,602 A | 2/1990 | Skagerlund | |
| 4,991,509 A * | 2/1991 | Smith | 102/213 |
| 5,014,621 A | 5/1991 | Fox et al. | |
| 5,018,446 A * | 5/1991 | Benedikter et al. | 102/213 |
| 5,142,985 A * | 9/1992 | Stearns et al. | 102/213 |
| 5,196,645 A * | 3/1993 | Wisshaupt | 102/213 |
| 5,291,261 A | 3/1994 | Dahl et al. | |
| 5,783,793 A * | 7/1998 | Emerton et al. | 219/121.71 |
| 5,784,156 A * | 7/1998 | Nicholson | 356/141.5 |
| 6,279,478 B1 * | 8/2001 | Ringer et al. | 102/213 |
| 6,507,392 B1 * | 1/2003 | Richards et al. | 356/141.5 |
| 6,705,230 B1 * | 3/2004 | Nichols | 102/213 |
| 6,817,296 B2 * | 11/2004 | Ringer et al. | 102/213 |
| 6,943,873 B2 * | 9/2005 | Sallee | 356/141.1 |
| 7,095,489 B2 * | 8/2006 | Jennings et al. | 356/5.01 |
| 7,554,076 B2 * | 6/2009 | Wang et al. | 250/221 |
| 7,575,190 B2 * | 8/2009 | Sallee | 244/3.16 |
| RE41,769 E * | 9/2010 | Richards et al. | 356/141.5 |
| 2002/0157887 A1 | 10/2002 | Sugawara et al. | |
| 2003/0016348 A1 | 1/2003 | Sallee | |
| 2003/0043058 A1 * | 3/2003 | Jamieson et al. | 340/961 |
| 2003/0179367 A1 | 9/2003 | Jennings et al. | |
| 2010/0107915 A1 * | 5/2010 | Geswender et al. | 102/211 |

FOREIGN PATENT DOCUMENTS

| | | |
|---|---|---|
| EP | 0 566 027 A1 | 10/1993 |
| FR | 2 745 899 A1 | 9/1997 |
| WO | WO 02/29436 A1 | 4/2002 |
| WO | WO 2006/119929 A2 | 11/2006 |

* cited by examiner

OPTICAL PROXIMITY FUZE

FIELD OF THE INVENTION

The present invention relates specifically to an optical proximity fuze for guided missiles and other such ballistic or flying devices. The invention relates more generally to an optical sensor for a moving device, for detecting objects that may collide with the moving object.

BACKGROUND ART

It is known to provide guided missiles with a fuze for initiating detonation of the missile when a predetermined condition is satisfied, such as impact against a hard object, or reaching a particular altitude, or an object appearing within the Field of View of a fuze sensor at short range. Thus a guided missile may have a long range guidance sensor operating by radar, ladar, infrared sensing etc, and a separate short range sensor which may also operate by radar, optical sensing, etc. Known optical fuze sensors operate over a very limited range around the missile, which creates the risk that a target may not be detected. One of such known optical fuze sensors is described in an article entitled "Advanced Optical Fuzing Technology" by Christian von der Lippe and J Jiang Liu, published in 2006 by The International Society for Optical Engineering in the SPIE Newsroom under the number 10.1117/2.1200601.066.

SUMMARY OF THE INVENTION

The object of the invention is to provide an improved active optical sensor for a proximity fuze for a guided missile, or other such ballistic or flying device.

The present invention provides in a specific aspect a optical proximity fuze for a ballistic or flying device comprising an array of optical apertures distributed about the outer surface of the device, an optical wave guide network selectively coupling the array of optical apertures to a laser source means and to a photodetector means, such that light from said laser source means is emitted by selected ones of said apertures, and light returned from a target is received by selected ones of said apertures and directed by said optical waveguide network to said photodetector means.

In accordance with the invention, there is potential for a large number of small sensor apertures to be placed on a missile surface. These apertures might be arranged to form a composite target images in a particular direction, and/or may be arranged to perform a sensing operation along selected directions. An important aspect of the invention is the inherent flexibility in the way the fuze can be configured in the missile, by reason of said optical waveguide network, so that the fuze can be optimised for different roles or targets.

In a more general aspect, the invention relates to an optical sensor for any moving device, such as road vehicles, trains, robots etc, where obstacles or other objects that may collide with the moving device are sensed.

The invention therefore provides in this more general aspect, an optical sensor for a moving device comprising an array of optical apertures distributed about the outer surface of the device, an optical wave guide network selectively coupling the array of optical apertures to a laser source means and to a photodetector means, such that light from said laser source means is emitted by selected ones of said apertures, and light returned from a target is received by selected ones of said apertures and directed by said optical waveguide network to said photodetector means.

Said optical apertures may take any convenient physical form, for example ends of optical waveguides, such as optical fibres. As preferred, they comprise lenses or other transmissive elements for collimating and directing light. In one form, each aperture comprises a ball lens, which is a small generally spherical silica lens, of the order of hundreds of micrometers in diameter, or greater, which collimates the light emitted from the end of an optical fibre or couples received light back into an optical fibre. Such a ball lens gives a collimated beam of light along the axis of an optical fibre in the region of the connection to the ball apertures. Returned pulses of light may be returned back into the ball lens and along the optical fibre axis.

Such ball lenses, or other optical aperture elements that may be employed, are desirably such that they do not extend a significant distance from the surface of said device, and present insignificant or minimal aerodynamic drag. This may be achieved by employing aperture elements of small size, e.g. ball lens, and/or mounting the aperture element within a recess in the device surface.

Said apertures provide appropriate numerical apertures. Conveniently, said apertures provide narrow angle beams. Ball lenses may provide collimated beams, or at least approximately so, to within a few degrees, depending on ball size. Said apertures may be so arranged that an aperture arranged for emitting light is disposed relative to an aperture for receiving light, so that reflected or returned light from a target is collected by the receiving aperture. Thus a first set of apertures is provided for emitting light, and a second set of apertures is provided for receiving returned light. As preferred pairs of apertures are provided, each pair comprising a first aperture from the first set and a second from the second set, for receiving returned light emitted by the first aperture. Where the apertures provide approximately collimated beams, the apertures of each pair are positioned close to one another.

In one form of the invention, a group of apertures are positioned close to one another and oriented such that the transmitted beams and receiver fields of view (beams) are pointing in the same direction, so as to provide a single composite aperture which extends over a much larger area than that provided by a single aperture to enable an image to be formed of a target.

In at least preferred embodiments of the invention, an array of transmitter and receive apertures are provided on the body or nose of the device. These apertures may be arranged in pairs, with one transmitter and one associated receiver per pair. Within the missile there is a laser light source, photodetector, and a reconfigurable fibre network for selectively distributing the laser light amongst the transmitter apertures. Each lens is of a small size so that aerodynamic drag is minimal, and provides an approximately collimated beam of light (of the order of a few degrees) in a selected direction, so that when a pulse has been emitted from a transmitter aperture, a nearby target may reflect a portion of the pulse into an associated receiver aperture.

Target position relative to the missile axis may be anywhere within a wide range of angles, such as between +/−90 degrees in elevation and azimuth, corresponding to the forward hemisphere, for example. In accordance with the invention, the array of transmitter and receiver apertures may be arranged such as to provide collimated beams of light and coextensive receiver Fields of View that cover the whole range of possible directions for a target. The apertures may be concentrated in more likely directions for sensing the target, such as close to the axial direction of movement. Alternatively, for example, they may be positioned at regular intervals around the circumference, pointing at an angle to the missile axis, where the missile might be in a more favourable position relative to the target, for achieving target defeat.

In a preferred form, an optical waveguide network couples the array of lenses to a single laser source and a single photodetection means. The photodetection means comprises one or more photodetectors, e.g. avalanche photodetectors. The laser source comprises one or more laser devices. The laser source may be CW, or may provide a sequence or train of light pulses which are distributed to the individual transmit apertures through the waveguide network. The transmit apertures may emit light in a scanning mode of operation from one or more apertures at a time, or in an unscanned mode from all apertures simultaneously.

It may be convenient to divide the optical waveguide network into a transmit section and a receiver section. The transmit section may include a reconfigurable fibre network for providing the required mode of light emission, be it of a scanning mode or a staring mode where transmit apertures exist simultaneously. The receiver section may provide simple connections to one or more photodetectors or may incorporate a fibre network providing a multiplex function of light from a number of receiver apertures to a single photodetector, as described below.

Said reconfigurable fibre network may include an Acousto Optical Deflector (AOD). In some circumstances, a multi-input/output optical switch formed for example of MEMS micro-mirrors, or solid state switches may be employed.

To enable discrimination between individual receiver apertures, or groups of apertures, and hence provide information on the direction of the target, the waveguide network may employ a series of time delay mechanisms built into the network so that light pulses from respective apertures have respective assigned time delays. WO-A-02/29436 discloses providing differing time delays for incoming pulses by differing lengths of optical fibre. Alternatively in addition optical time delay devices may be incorporated into the network for giving selected delays, for example, by devices incorporating programmable waveguides. The same process may be applied to groups of apertures that are each looking at neighbouring regions of space, so that a stream of pulses is output by the photodetector from which a three-dimensional image of the target (angle-angle-range) can be assembled in processing, following time of flight measurement.

If time of flight is being measured, the time interval between pulse transmission and reception represents range. Alternatively if a pair of transmit and receive apertures are orientated such that the receiver Field of View only intersects the transmitted beam over a small spatial extent, then range information may not be necessary. In this case, the laser does not need to be pulsed, as the presence of a return signal indicates that a target is present, in the overlap region, for which the range is known.

BRIEF DESCRIPTION OF THE DRAWINGS

For a better understanding of the present invention, reference will now be made, by way of example only, to the accompanying drawings in which:—

DESCRIPTION OF THE DRAWINGS

Figure 1:
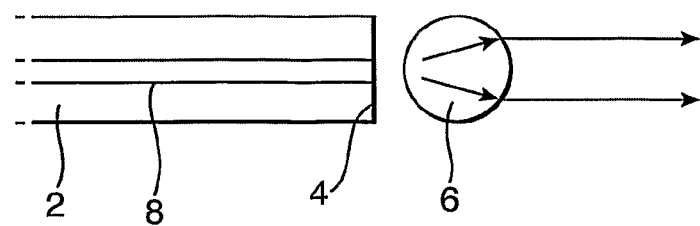
FIG. 1 shows an optical fibre with a ball lens at its end for use as an optical aperture with the embodiments of the present invention described herein.

In the following description of the drawings, similar parts are denoted by the same reference numeral.

Referring to FIG. 1, there is shown a mechanism employed in the present invention, that is, an optical fibre 2 having at its end 4 a ball lens 6. The core 8 of the fibre conducts light which is transmitted through lens 6 which collimates the lights to provide an approximate unidirectional beam 10. Lens 6 therefore provides an optical aperture for emitting light, in accordance with the invention.

Figure 2:
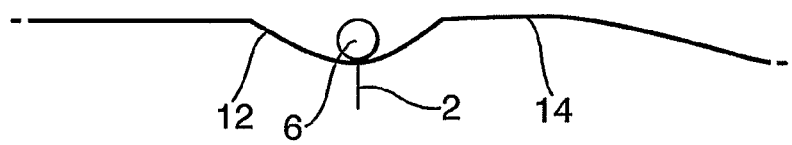
FIG. 2 shows such a ball lens located in a recess of a missile exterior surface.

Referring to FIG. 2, lens 6 is located in a small recess 12 in the surface 14 of the nose section of a guided missile. The recess is sufficiently deep, that the ball lens does not project a significant extent above the surface of the missile so that the lens is protected from unintentional damage and does not create any undesirable aerodynamic effects. The shape of the recess shown is not necessarily a preferred shape, but merely illustrates that the lens does not have to protrude above the missile skin.

Figure 3:
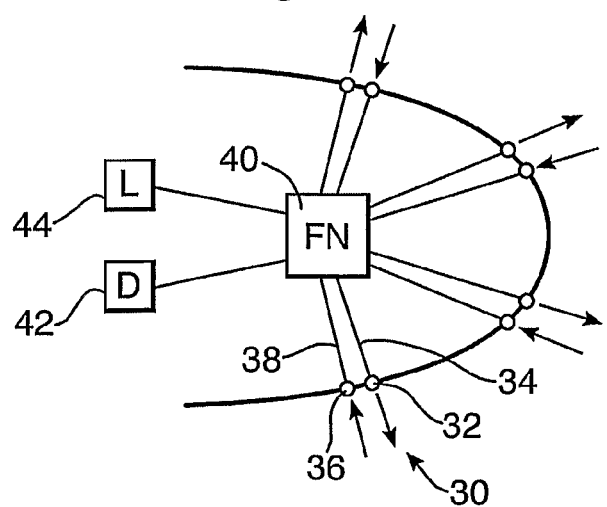
FIGS. 3 to 6 are schematic illustrations of first, second, third and fourth embodiments of the present invention employing various arrays of lasers, photodetectors and fibre networks coupled to aperture elements located on the exterior of a missile nose.

Referring to FIG. 3, a first embodiment of the present invention comprises an array of optical apertures 6 each comprising a ball lens, distributed over the nose section 14 of a missile skin. The apertures are arranged in pairs 30 with the apertures of each pair positioned close to one another. A first aperture 32 of each pair is coupled to a fibre 34 for transmitting light, and a second aperture 36 is arranged to receive light, which is returned light from that transmitted by aperture 34 and reflected and/or scattered from a target object, and to convey such reflected light through fibre 38.

The various pairs of fibres 34, 38 are coupled through a fibre network 40 to a single photo detector 42 and a single laser source device 44. Fibres 34, 38 and network 40 constitute an optical waveguide network in accordance with the invention. Laser 44 is arranged to emit a series of light pulses and these are distributed by fibre network 40 to optical fibres. The fibre network 40 may be of a fixed configuration for distributing the lights in a fixed predetermined way. Alternatively the fibre network may incorporate an optical switch or AOD that permits reconfiguration of the fibre network so that the fibre pairs may be scanned in any desired way. The scanning may be dynamically reconfigurable so as to adjust the scanning operation while the missile is closing on a target.

Figure 4:
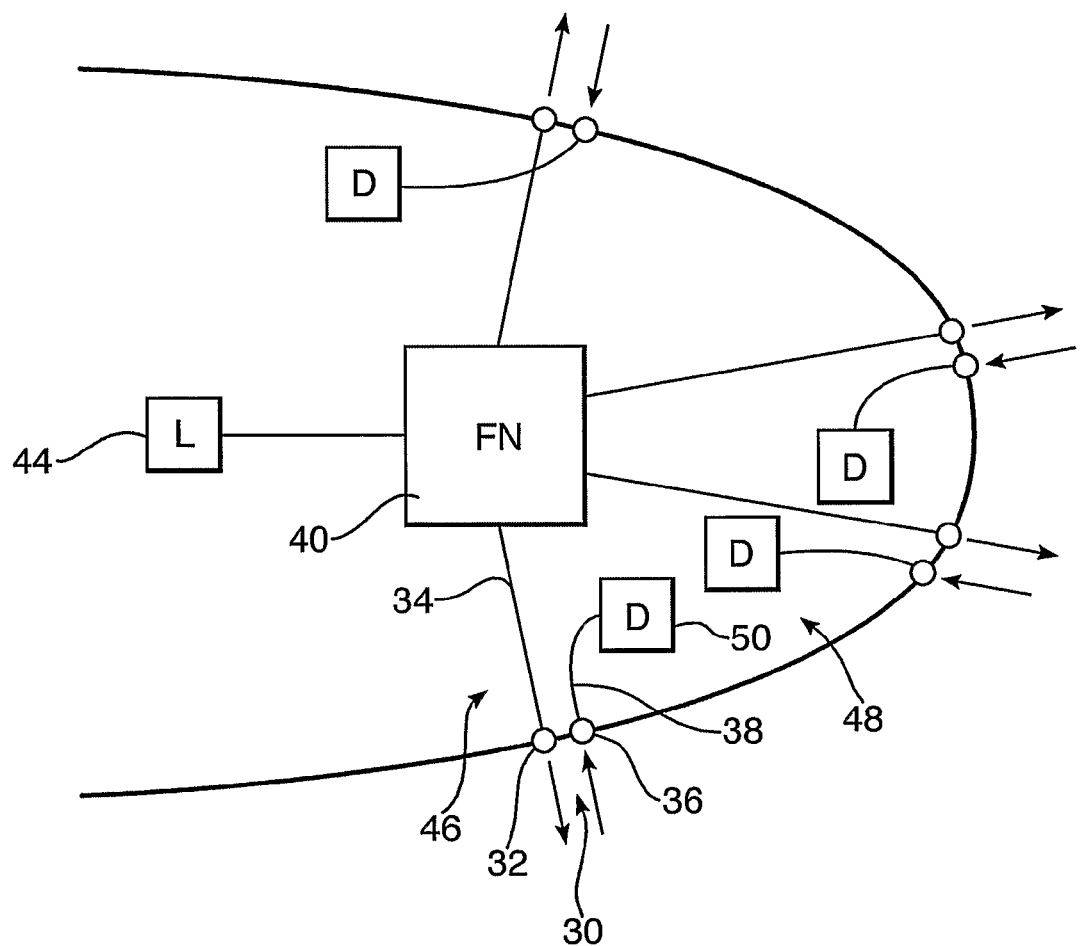

Referring now to FIG. 4, this shows a second embodiment of the present invention. In FIG. 4, each receiver aperture 36 of an aperture pair is coupled through a fibre 38 to a respective photodetector 48. Network 40 and fibres 34 constitute a transmit section 46 of the optical waveguide network, and fibres 38 and photodetectors 48 constitute a receive section 50. This has the advantage of simplifying the network and the distribution of received pulses, although the disadvantage is that it is now necessary to provide several photodetectors.

Figure 5:
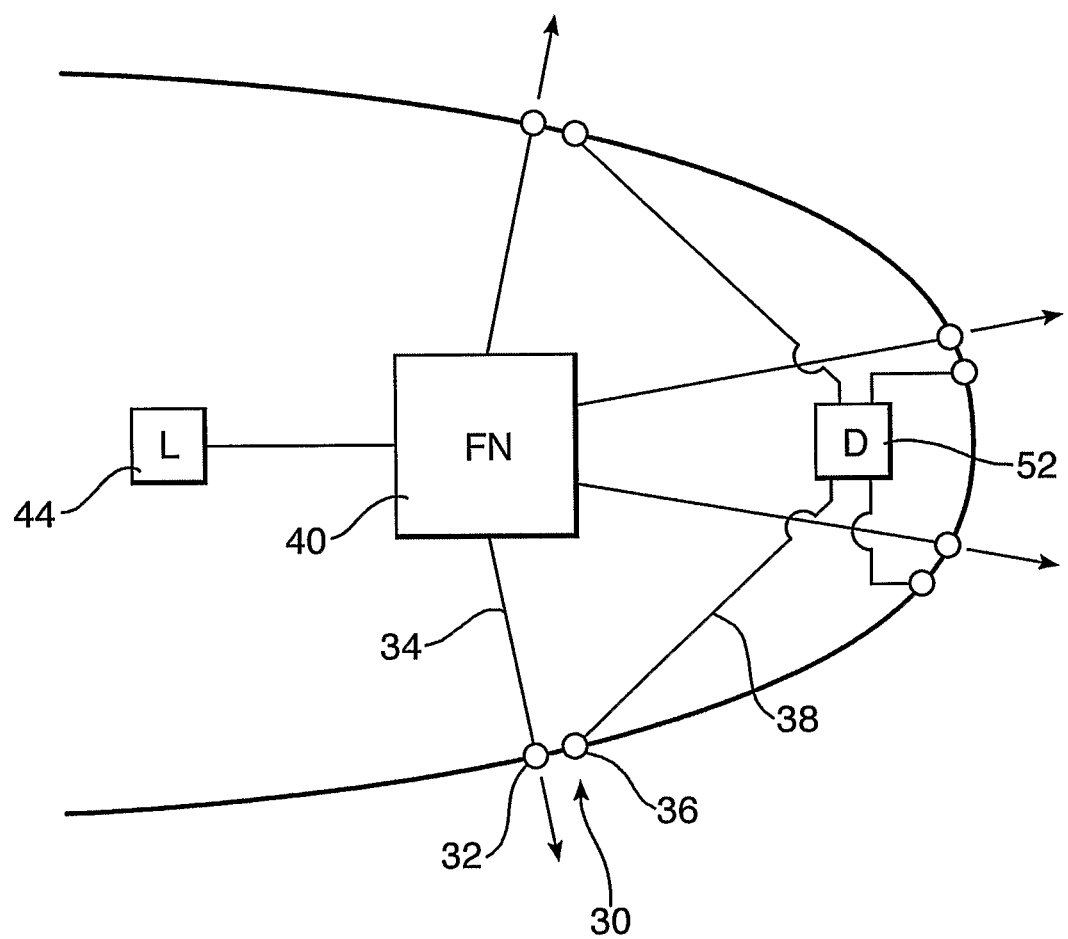

Referring now to FIG. 5, this shows a third embodiment of the present invention. In this embodiment, the receiver aperture 36 of each pair of apertures is coupled through a respective optical fibre 38 to a common photodetector 52. The photodetector is enabled to distinguish between the various inputs to the photodetector by reason of the outgoing transmitter pulses being emitted in a time sequential order by fibre network 40. Alternatively, if it is not necessary to distinguish between the different receiver apertures, then the transmitter can emit pulses from all apertures simultaneously. A signal from the photodetector then indicates only the presence of a target.

Figure 6:
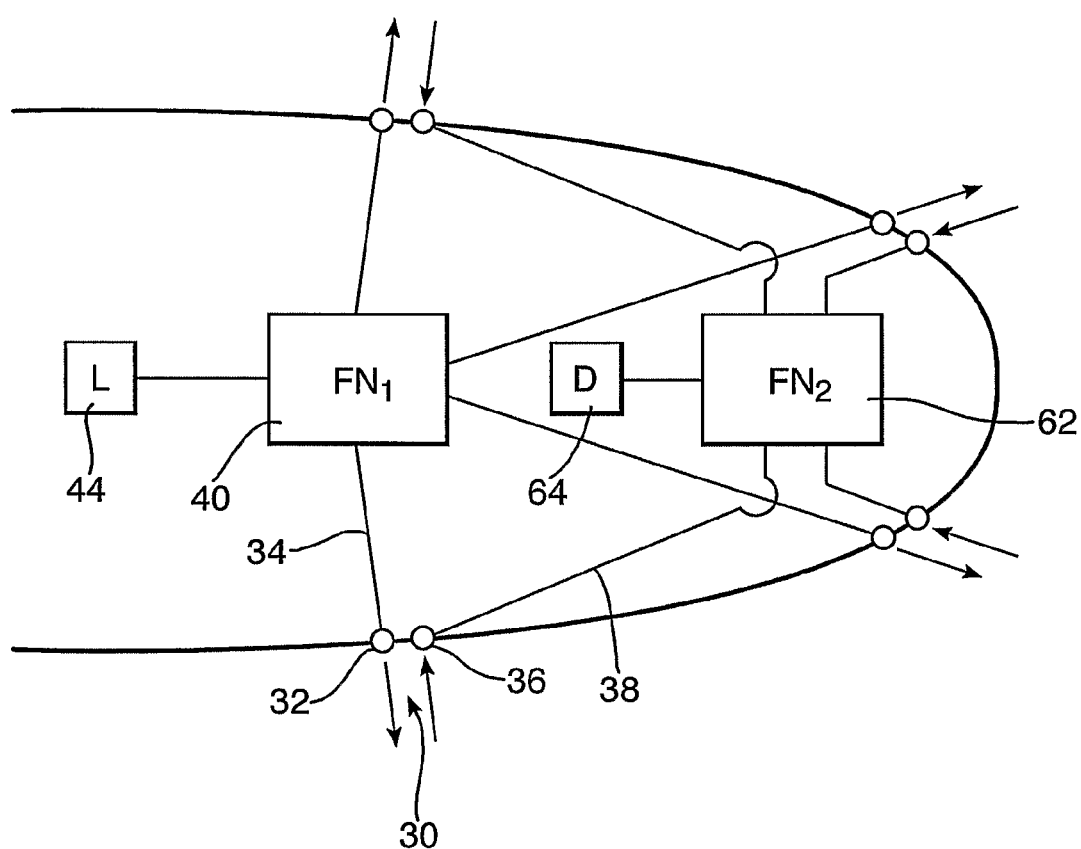

Referring now to the fourth embodiment of the invention shown in FIG. 6, the receiver apertures 36 are coupled through respective fibres 38 to a second fibre network 62, and the thence to a single photodetector 64. Fibres 38 and network 62 constitute a waveguide network receive section 50. The fibre network 62 may be configured as described WO-A-02/29436, wherein differing time delays for incoming pulses are provided by differing lengths of optical fibre, so as to enable a time multiplexing arrangement wherein incoming pulses on separate fibres may be combined onto a single fibre 66 which is coupled to a single photodetector 64.

Figure 7:
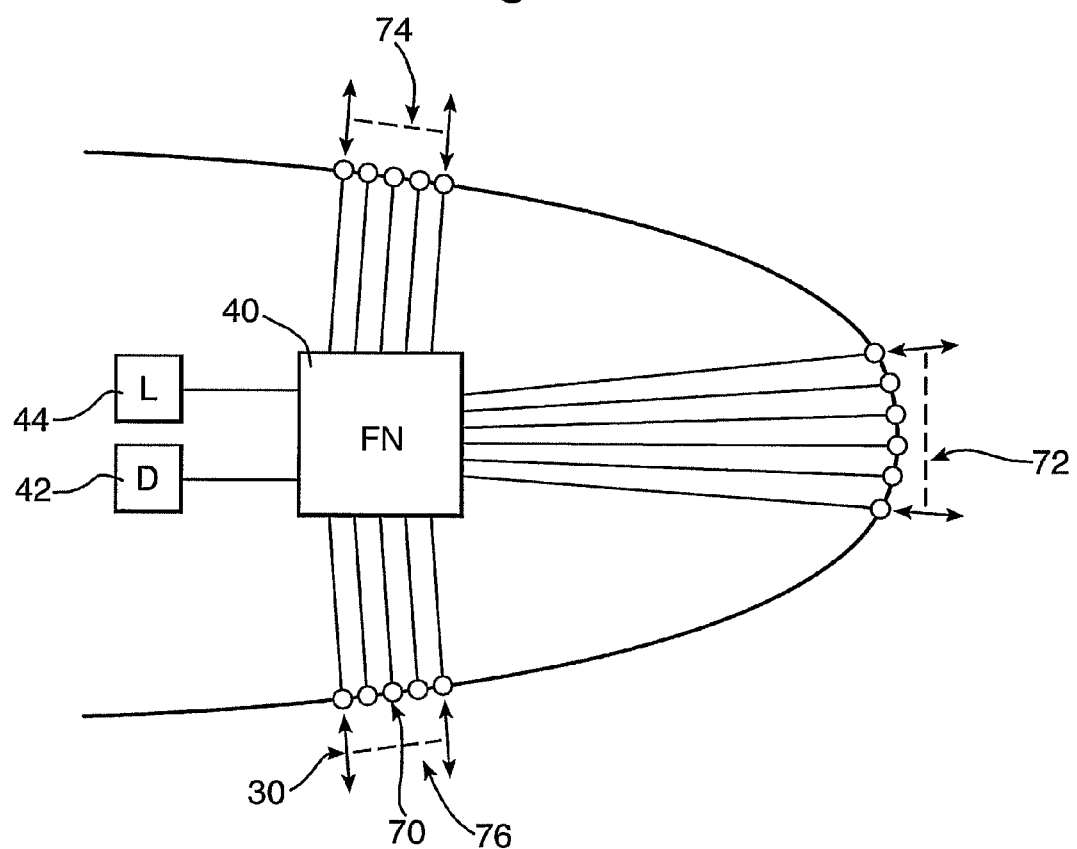
FIGS. 7 and 8 are schematic illustrations of fifth and sixth embodiments of the present invention wherein the apertures arranged on the nose of a missile provide an imaging facility.
Figure 8:
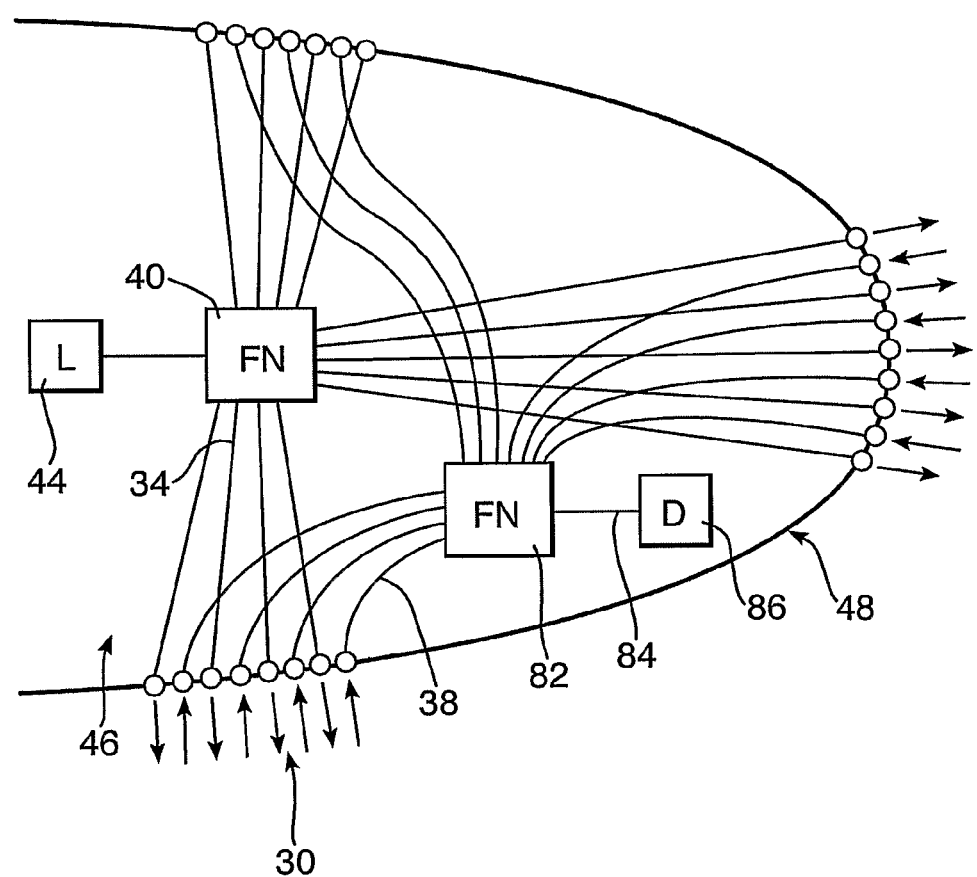

Referring now to FIG. 7 which shows a fifth embodiment of the present invention this is arranged to generate an image of the target. To this end, many pairs of apertures 32, 36 are positioned close to one another in a matrix or line 70 and are sufficiently close that the apertures overlap so as to provide a single composite aperture which extends over a large spatial region. As shown in FIG. 7, three separate composite apertures are provided, a main aperture 72 at the tip of the nose in the forward direction and a plurality of apertures 74, 76 directed radially at the side of the nose tip. A first reconfigurable fibre network 40 is configured to process transmitted light pulses from a single laser source 44. The receive aperture 36 of each aperture pair is coupled through optical fibres 38 to a second reconfigurable fibre network 80, and thence on a single optical fibre 84 to a single photodetector 86. The fibre network 80 may be constructed in accordance with WO-A-02/29436, varying different time delays for incoming pulses are provided by differing lengths of optical fibre so as to enable a multiplexing arrangement wherein incoming light on the various fibres 38 is multiplexed onto a single optical fibre 84 and photodetector 86. Thus, network 40 and fibres 34 provide a transmit section 46 of the optical waveguide network, whereas network 82 and fibres 38 provide a receive section 48.

In modifications of the above described embodiments, although it has been described the apertures for convenience are arranged in pairs of receive lens and transmit lens, in some circumstances it may be appropriate to have more than one receive apertures for each transmit apertures, or vice versa.

Whilst in the apertures described the light is transmitted perpendicular or normal to the surface of the nose, the light may in some circumstances be transmitted at an angle to the nose surface.

Whilst in the embodiments described optical fibres are employed to constitute the waveguide network, in appropriate circumstances, fibres may be replaced by other optical waveguides, e.g. tracks formed on substrates.

The invention claimed is:

1. An optical sensor for a moving device comprising an array of optical apertures distributed about the outer surface of the device, and a reconfigurable optical waveguide network comprising an adjustable optical device configured to selectively couple the array of apertures to a laser source and to a photodetector in a plurality of modes, the adjustable optical device being configured such that light from said laser source is emitted simultaneously by selected ones of said apertures in selected directions, and light returned from a target is received by selected ones of said apertures and coupled via respective wave guides of said network to said photodetector, to sense targets in selected directions, the respective waveguides being arranged to provide respective predetermined delays for returned light from each of said selected apertures so as to enable a multiplexing of the received light on to an optical wave guide which is coupled to said photodetector, wherein in one mode light is emitted and received to sense a target in one direction and in a second mode light is emitted and received to sense targets in multiple directions.

2. An optical sensor according to claim 1, wherein a first set of said array is coupled to said laser source to emit light, and a second set of said array is coupled to said photodetector for reception of returned light.

3. An optical sensor according to claim 2, wherein said array of apertures is arranged in pairs, with a first aperture of each pair forming part of said first set, and a second aperture of each pair forming part of said second set and arranged to receive returned light emitted by the first aperture.

4. An optical sensor according to claim 1, wherein each aperture provides a generally collimated or narrow light beam.

5. An optical sensor according to claim 4, wherein each aperture comprises a collimating lens.

6. An optical sensor according to claim 1, wherein each aperture is sufficiently small and/or is mounted in a recess within the outer surface of said device such that the aerodynamic drag is not significant.

7. An optical sensor according to claim 1, wherein each aperture is coupled to an end of a respective optical wave guide.

8. An optical sensor according to claim 1, wherein said laser source comprises a single laser device.

9. An optical sensor according to claim 1, wherein said array of apertures includes a first group of apertures which are positioned close to one another on the outer surface of the guided object such as to provide a single composite aperture over a relatively wide region so as to enable imaging of a target.

10. An optical sensor according to claim 9, wherein the composite aperture of said first group is arranged to be pointing in a first direction, and at least one further such group providing a single composite aperture pointing in a second direction.

11. An optical sensor according to claim 9, wherein said optical waveguide network includes a first reconfigurable optical fibre network selectively coupling the optical apertures of said group or groups to said laser source and a second optical fibre network selectively coupling the optical apertures of said group or groups to said photodetector.

12. The optical sensor according to claim 1 wherein the adjustable optical device is an optical switch.

13. The optical sensor according to claim 1 wherein the adjustable optical device is an acousto-optic deflector.

14. An optical fuze for a ballistic or flying device comprising an optical sensor according to claim 1.

\* \* \* \* \*